Nov. 12, 1940.   F. C. BEST   2,221,178
SIGNAL DEVICE
Filed Aug. 3, 1938   2 Sheets-Sheet 1

INVENTOR.
Frank C. Best
BY
Sibbitts & Hart
ATTORNEYS.

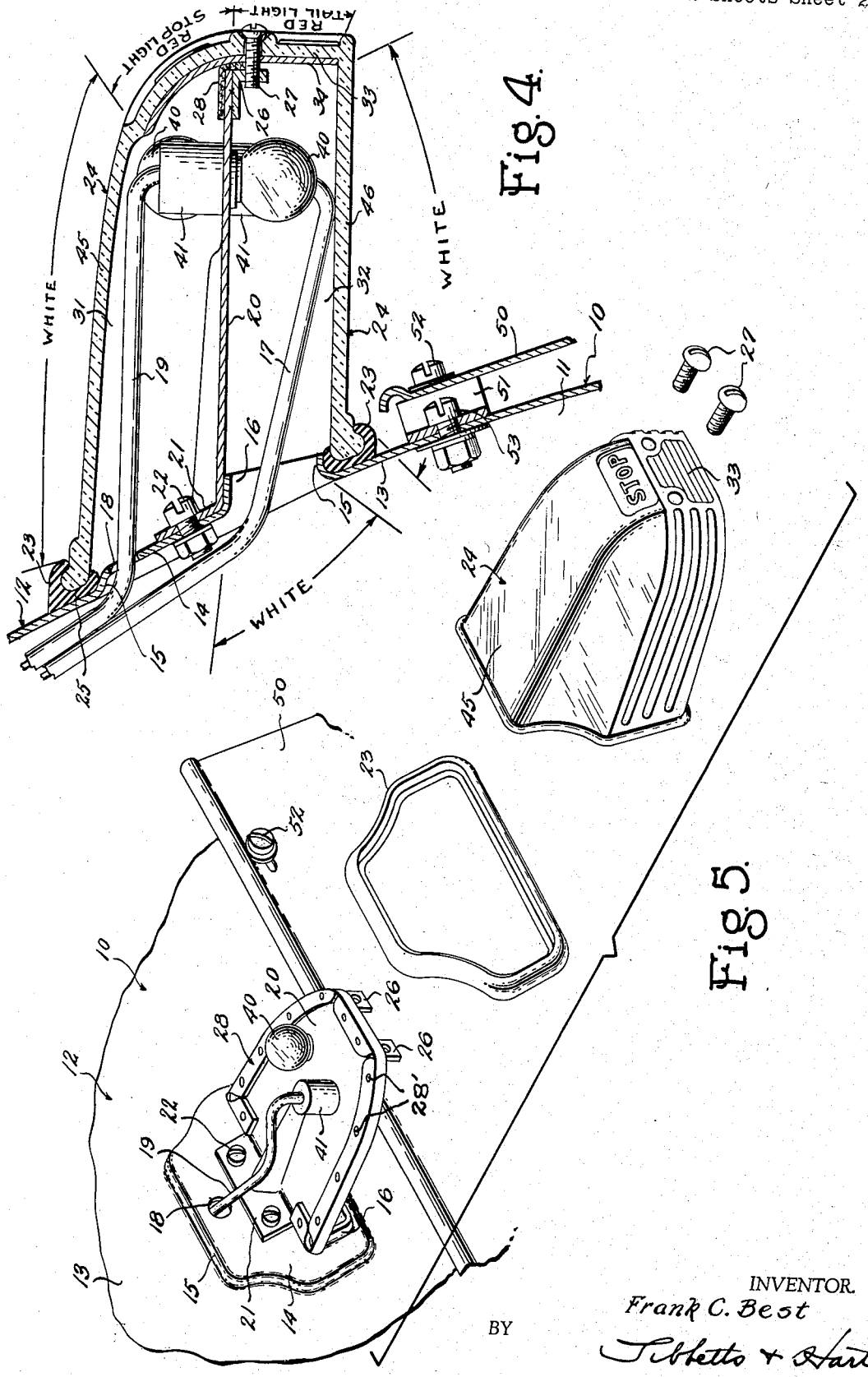

Patented Nov. 12, 1940

2,221,178

UNITED STATES PATENT OFFICE 2,221,178

SIGNAL DEVICE

Frank C. Best, Detroit, Mich., assignor to Packard Motor Car Company, Detroit, Mich., a corporation of Michigan Application August 3, 1938, Serial No. 222,882

4 Claims. (Cl. 177—329)

This invention relates to motor vehicles and more particularly to lighting equipment for motor vehicles.

An object of the invention is to provide a rear lighting and signal device for motor vehicles that can be manufactured at low cost.

Another object of the invention is to provide a rear lighting and signal device for a motor vehicle that can be readily assembled and dismantled.

Another object of the invention is to provide a compact lighting structure for application to the luggage compartment door of a motor vehicle that can be utilized to serve as stop and rear light signals and to illuminate the license plate, the luggage space, and the upper portion of the door panel.

Still another object of the invention is to provide a compact lighting and signal structure that can be readily assembled with a motor vehicle in leak-proof and dust-proof relation.

Other objects of the invention will appear from the following description taken in connection with the drawings, which form a part of this specification, and in which:

Fig. 4 is another sectional view of the lighting and signaling device taken on line 4—4 of Fig. 2;

Fig. 5 is an exploded view of the lighting and signaling device.

Figure 1:
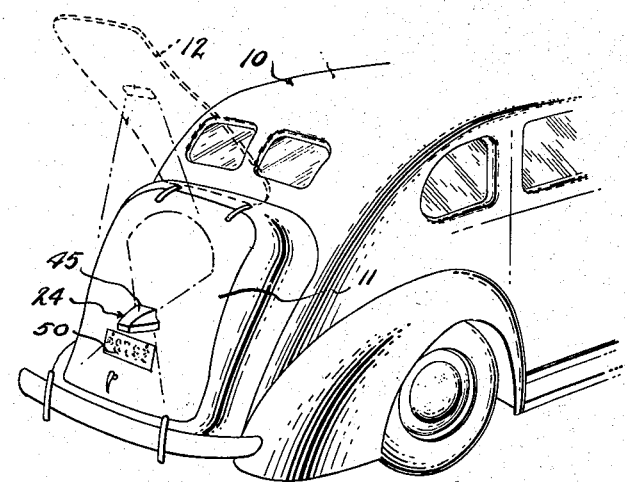
Fig. 1 is a perspective view of the rear end of a motor vehicle having the invention associated therewith.
Figure 2:
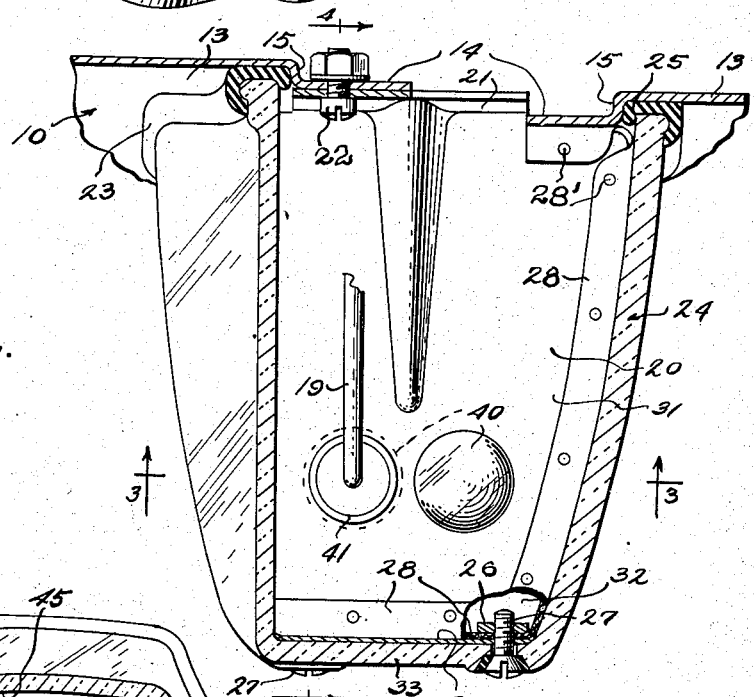
Fig. 2 is a sectional view of the lighting and signaling device taken on line 2—2 of Fig. 3.
Figure 3:
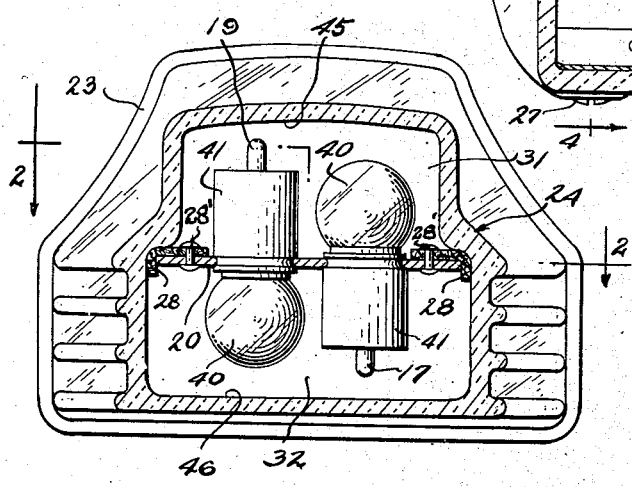
Fig. 3 is another sectional view of the lighting and signaling device taken on line 3—3 of Fig. 2.

In the drawings, 10 designates generally a motor vehicle sedan body having the usual luggage compartment 11 in the rear end thereof and the usual hinged door 12 for closing the luggage compartment opening. The door includes as a part thereof a sheet metal panel 13 with which is associated a combined lighting and signaling device forming the subject matter of the invention.

A portion 14 of the metal panel is pressed outwardly in a rearward direction and forms a boundary flange 15 of a suitable design. Within the boundary flange the panel is formed with another rearwardly extending flange 16 that defines an opening for a conduit 17, and the pressed-out portion of the panel is also formed with another opening 18 through which the conduit 19 extends. These conduits extend through the luggage space and are connected with the conventional source of electrical supply for furnishing illumination. This flange 16 also serves as a support for a bracket 20, the bracket having an angular end 21 arranged to seat against flange 16 and to be secured against the door panel by suitable means such as screw bolts 22.

Surrounding the flange 15 on the rear door panel and conforming to the shape thereof is arranged a suitable sealing strip that can take the form of a rubber gasket 23. A casing, indicated generally at 24 and formed preferably of transparent material such as glass, is provided with an open end 25 that corresponds in outline to and seats against the gasket. A means is associated with the casing and bracket to secure the same together in a relation that will place the open edge portion of the casing tightly against the gasket. Such means includes downwardly flanged elements 26 that are fixed by welding or other suitable means to the extreme rear end of the bracket. Screws 27 extend through the rear end of the casing and the flanges of elements 26 to secure the casing to the bracket and to clamp the open edge portion thereof against the gasket. A gasket 28 is arranged between the rear end and sides of the bracket 20 and the casing to fill in any space that might result from inaccuracies in manufacture and also serve as a buffer means between the bracket and the glass casing. Suitable fastening means, such as rivets 28' secure the gasket 28 to the edge portion of the bracket. The general outline presented by the bracket device conforms to the interior outline of the casing so that the bracket, in addition to serving as a support, provides a partition that separates the interior of the casing into isolated compartments 31 and 32.

As before stated, the casing is preferably formed with glass and the rear wall 33 has means provided therewith that will cause a red light to be projected therefrom. In the present instance this result is obtained by a plate 34 arranged along the inner face of the rear wall of the casing and secured in such position by screws 27. The plate is formed of a material that will cause the light showing therethrough to be some suitable color such as red. Within each compartment 31 and 32 is a light bulb 40 and mounted on the bracket in each compartment is a connector 41 with which a cable and a light bulb are associated. These connectors 41 have a socket end projecting through the bracket to receive the bulb in the opposite compartment and each has one of the cables 17 or 19 connected therewith.

The upper wall 45 of the casing and the lower wall 46 of the casing will reflect a white light because the glass portion thereof is not colored and, as a result, the upper lamp bulb 40 will throw a white light upon a portion of the rear door panel thereabove, and the bulb in the lower compartment will throw a white light upon the portion of the panel therebelow and such light being utilized to illuminate the license plate 50 that is fixed to brackets 51 thereunder by screws 52, the brackets being secured to the rear door panel by screws 53.

The compartment 32 aligns with the opening through the flange 16 and the bulb in such compartment will illuminate the interior of the luggage space through such openings so that when the rear door is raised the contents of the luggage space are easily discerned. The light bulb 40 in the lower compartment is controlled at the instrument board by the operator and when the conventional switch controlling the same is turned on, the light beams passing through the rear end of compartment 32 serve as a red tail light and also illuminate the license plate and the interior of the luggage space. The bulb 40 in compartment 31 is preferably turned on manually or automatically in the usual manner when the vehicle is getting ready to stop, so that at such times a red light will be seen at the rear end of the compartment 31 and a white light will be thrown upon a portion of the rear door panel above the casing wall 45. This lighting of a portion of the rear door, together with the red stop light, provides a readily discernible rear signal and serves to silhouette a person standing at the rear of the car to an oncoming driver.

The casing can be readily applied or removed by turning the two screws 27 into or out of engagement with the bracket and the bracket can be readily assembled or removed by turning the screws 22 into or out of engagement with the rear door panel. It will thus be seen that the illuminating and signaling device herein described is compact and performs a plurality of functions. It can be constructed at low cost and can be quickly assembled or dismantled so that assembly and service costs will be low.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. A signal device adapted to be mounted on a body panel of a vehicle comprising a bracket fixed at its forward end to the panel, a transparent casing secured to the rear end of said bracket, said bracket dividing said casing into two isolated compartments, and light bulbs fixed one on each side of the bracket.

2. A signal device adapted to be mounted on a body panel of a vehicle comprising a bracket fixed at its forward end to the panel, a transparent casing having an open front end adapted to be telescoped over the bracket, said bracket dividing the casing into two isolated compartments, means securing the rear end of the casing to the bracket, light bulbs fixed one on each side of the bracket, and conductors extending through the open front end of the casing and connected with the bulbs.

3. A signal device adapted to be mounted on a body panel of a vehicle comprising a bracket fixed at its forward end to the panel, a transparent casing surrounding said bracket, a gasket between the forward end of the casing and the panel, said bracket dividing the casing into isolated compartments, means fixing the casing to the rear end of the bracket and pressing the forward end of the casing against the gasket, and light bulbs fixed to the bracket and arranged one in each compartment.

4. A signal device adapted to be mounted on a body panel of a vehicle comprising a bracket fixed at its forward end to the panel, a transparent casing secured to the rear end of said bracket, said bracket dividing said casing into two isolated compartments, a gasket between the forward end of said casing and said panel, a second gasket between said bracket and said casing, and light bulbs fixed one on each side of the bracket.

FRANK C. BEST.